US011092107B2

(12) United States Patent
Kim et al.

(10) Patent No.: US 11,092,107 B2
(45) Date of Patent: Aug. 17, 2021

(54) COMBUSTION CHAMBER STRUCTURE OF ENGINE

(71) Applicant: Mazda Motor Corporation, Hiroshima (JP)

(72) Inventors: Sangkyu Kim, Higashihiroshima (JP); Takashi Sumimoto, Hiroshima (JP); Daisuke Shimo, Hiroshima (JP); Tomonori Harada, Hiroshima (JP); Shintaro Okada, Higashihiroshima (JP); Shuji Takuma, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 16/641,758

(22) PCT Filed: Aug. 23, 2018

(86) PCT No.: PCT/JP2018/031111
§ 371 (c)(1),
(2) Date: Feb. 25, 2020

(87) PCT Pub. No.: WO2019/044647
PCT Pub. Date: Mar. 7, 2019

(65) Prior Publication Data
US 2020/0392919 A1    Dec. 17, 2020

(30) Foreign Application Priority Data

Aug. 28, 2017  (JP) .............................. JP2017-163203
Nov. 6, 2017   (JP) .............................. JP2017-213834

(51) Int. Cl.
*F02D 41/40*   (2006.01)
*F02F 1/24*    (2006.01)
*F02F 3/12*    (2006.01)

(52) U.S. Cl.
CPC ......... *F02D 41/401* (2013.01); *F02D 41/403* (2013.01); *F02F 1/24* (2013.01); *F02F 3/12* (2013.01)

(58) Field of Classification Search
CPC ........ F02D 41/401; F02D 41/403; F02F 1/24; F02F 3/12
(Continued)

(56) References Cited

U.S. PATENT DOCUMENTS 4,721,080 A  *  1/1988  Moriyasu ............ F02B 23/0636
                                                    123/276
2003/0221658 A1    12/2003  Hiraya et al.
(Continued)

FOREIGN PATENT DOCUMENTS

EP    1369561 A2    12/2003
EP    3023610 A2    5/2016
(Continued)

OTHER PUBLICATIONS

European Patent Office, Extended European Search Report Issued in Application No. 18851330.3, dated May 4, 2020, Germany, 6 pages.

*Primary Examiner* — Joseph J Dallo
*Assistant Examiner* — Yi-Kai Wang
(74) *Attorney, Agent, or Firm* — Alleman Hall Creasman & Tuttle LLP

(57) ABSTRACT

An engine combustion chamber structure includes a combustion chamber of an engine and a fuel injection valve. The fuel injection valve injects fuel toward a cavity in a crown face of a piston. The cavity includes a first cavity provided in a radially central region of the crown face with a first bottom having a first depth, a second cavity provided in an outer side of the first cavity with a second bottom having a second depth being smaller than the first depth, a connecting portion, and a standing wall region disposed further in a (Continued)

radially outer side than the second bottom of the second cavity. The second bottom is provided lower than an upper end, of the connecting portion. A lower section of the standing wall region is provided further in a radially inner side than an upper edge of the standing wall region.

9 Claims, 13 Drawing Sheets

(58) Field of Classification Search
USPC .......................................................... 123/294
See application file for complete search history.

(56) References Cited

U.S. PATENT DOCUMENTS

| | | | |
|---|---|---|---|
| 2010/0122686 A1* | 5/2010 | Kim | F02B 23/0651 123/298 |
| 2012/0234285 A1* | 9/2012 | Venugopal | F02B 23/0669 123/193.6 |
| 2013/0073186 A1* | 3/2013 | Morinaga | F02D 13/0273 701/104 |
| 2015/0354519 A1 | 12/2015 | Shimo et al. | |
| 2016/0138520 A1 | 5/2016 | Subatch, Jr. et al. | |
| 2016/0341106 A1 | 11/2016 | Richard et al. | |

FOREIGN PATENT DOCUMENTS

| | | | |
|---|---|---|---|
| FR | 2902462 A1 | | 12/2007 |
| JP | 2001227345 A | | 8/2001 |
| JP | 2010101243 A | * | 5/2010 |
| JP | 2010101243 A | | 5/2010 |
| JP | 2010101244 A | | 5/2010 |
| JP | 2010121483 A | | 6/2010 |
| JP | 2012092778 A | * | 5/2012 |
| JP | 2012092778 A | | 5/2012 |
| JP | 2012184747 A | | 9/2012 |
| JP | 2015232288 A | | 12/2015 |

* cited by examiner

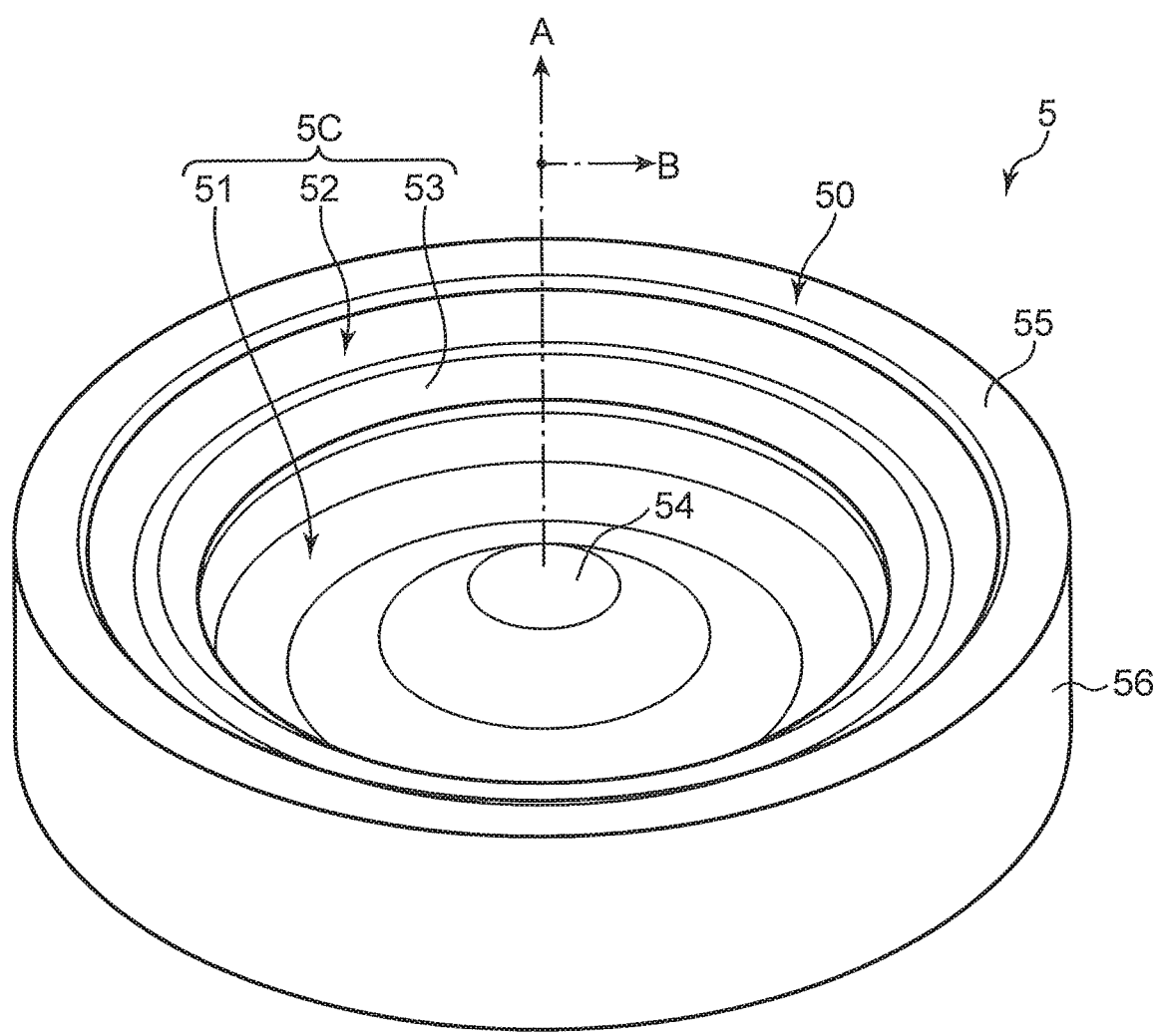

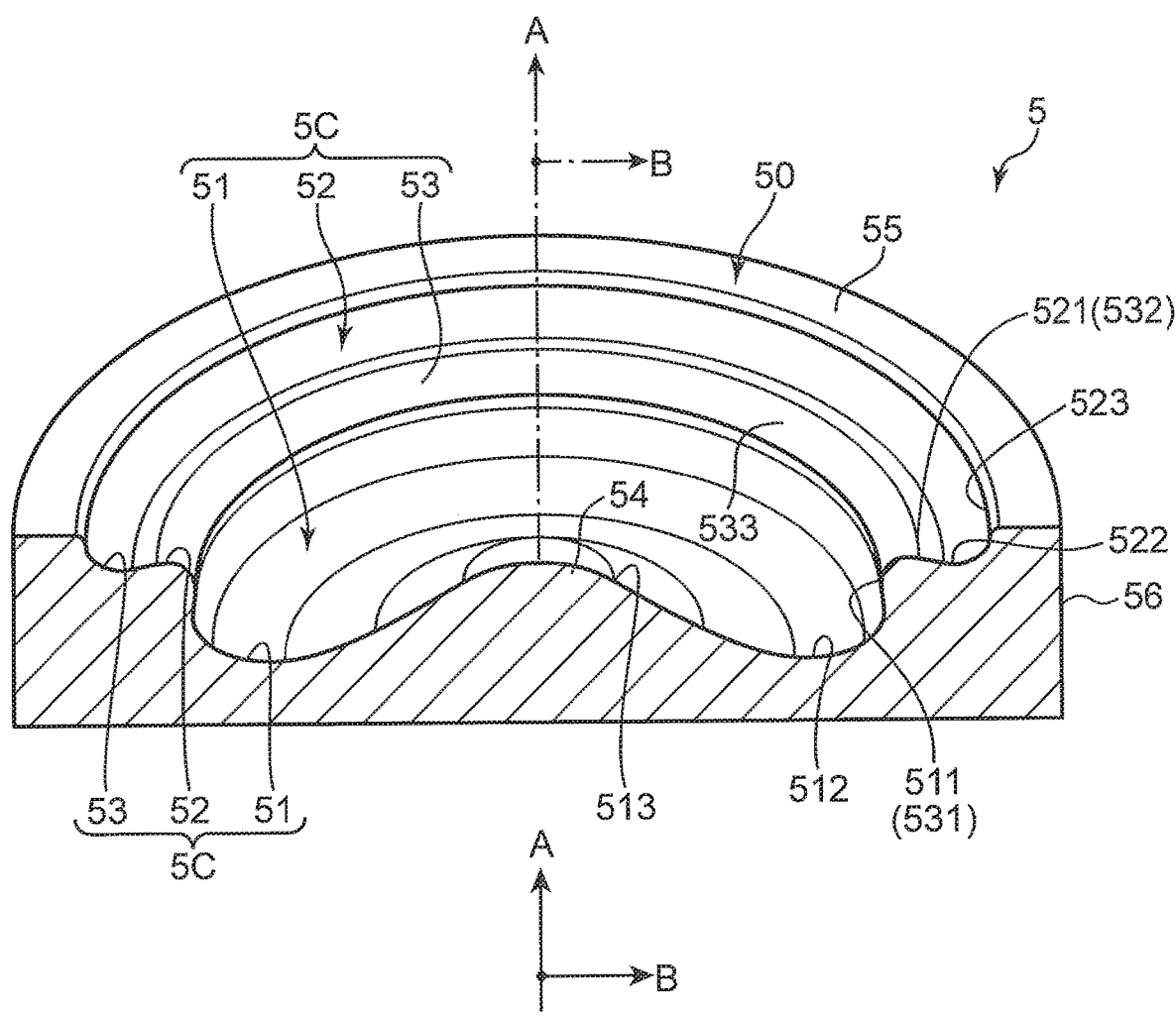

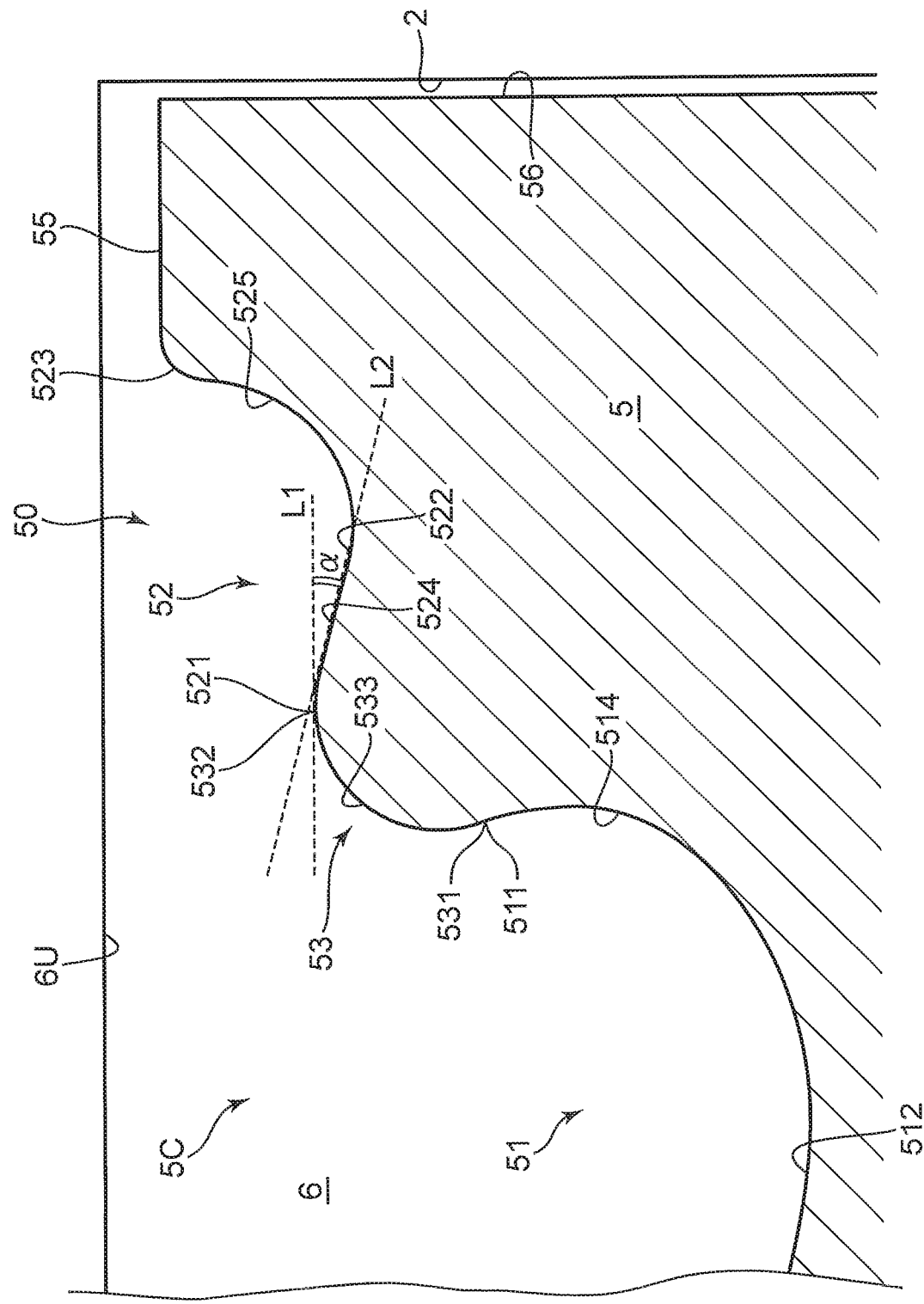

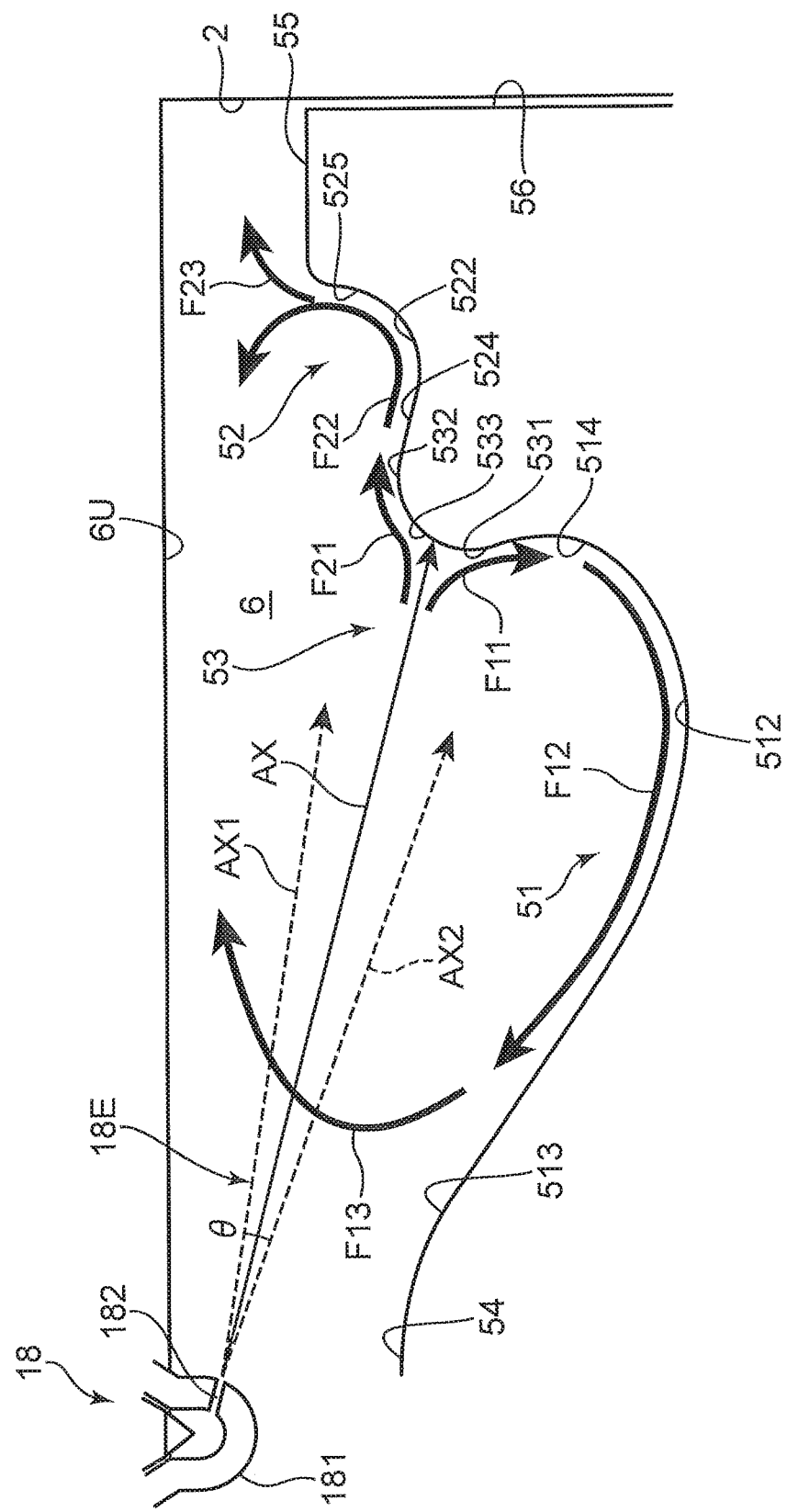

COMBUSTION CHAMBER STRUCTURE OF ENGINE

TECHNICAL FIELD

The present invention relates to an engine combustion chamber structure including a cylinder and a piston.

BACKGROUND ART

A combustion chamber of an engine for a vehicle, such as a car, is formed by an inner wall face of a cylinder, a bottom face of a cylinder head (top face of the combustion chamber), and a crown face of a piston. Fuel is supplied into the combustion chamber from a fuel injection valve. In a known combustion chamber structure, a cavity (recess) is provided in the crown face of the piston, and fuel is injected from the fuel injection valve toward the cavity. Patent Literature 1 discloses a combustion chamber structure including the cavity having a two-stage structure including an upper cavity and a lower cavity.

To reduce emission from the engine, such as NOx, CO, HC, and PM (soot), it is important not to create a locally high temperature region and a region short of oxygen while a mixed gas is combusted in the combustion chamber. In this case, it is ideal to perform combustion using a mixed gas having a uniform, lean fuel concentration throughout the space of the combustion chamber. Although the cavity provided in the crown face of the piston contributes to creating suitable combustion, the ideal combustion is currently still not achieved. For example, the cavity structure disclosed in Patent Literature 1 does not allow the mixed gas flowing along the upper cavity to sufficiently progress to a radially outer side of the combustion chamber, so that creation of a lean mixed gas is insufficient.

CITATION LIST

Patent Literature

Patent Literature 1: FR2902462A1

SUMMARY OF INVENTION

An object of the present invention is to provide an engine combustion chamber structure having a cavity in a crown face of a piston to create a uniform, lean mixed gas effectively using air in a combustion chamber and thereby producing as less emission, such as soot, as possible.

The engine combustion chamber structure according to an aspect of the present invention includes an engine combustion chamber formed by a lower face of a cylinder head, a cylinder, and the crown face of the piston, and a fuel injection valve that injects fuel into the combustion chamber. The crown face of the piston is provided with a cavity. The fuel injection valve injects fuel toward the cavity. The fuel injection valve is disposed at or near a radial center of the combustion chamber. The cavity includes a first cavity that is provided in a radially central region of the crown face and includes a first bottom having a first depth in a cylinder axial direction, a second cavity that is provided in the crown face to be in an outer side of an outer circumference of the first cavity and includes a second bottom having a second depth in the cylinder axial direction, the second depth being smaller than the first depth, a connecting portion that connects the first cavity to the second cavity, and a standing wall region disposed further in a radially outer side than the second bottom of the second cavity. The second bottom is provided lower than an upper end, regarding a cylinder axial direction, of the connecting portion. A lower section of the standing wall region is provided further in a radially inner side than an upper edge of the standing wall region.

BRIEF DESCRIPTION OF DRAWINGS

FIG. 2 is a perspective view of a crown face portion of a piston of the engine illustrated in FIG. 1.

FIG. 3 is a perspective view of the piston with a cross-section.

FIG. 4A is an enlarged view of the section of the piston illustrated in FIG. 3.

FIG. 5 is a cross-sectional view of the piston for explaining the relationship between the crown face of the piston and a fuel injection axis of an injector.

DESCRIPTION OF EMBODIMENTS

[General Configuration of Engine]

Figure 1:
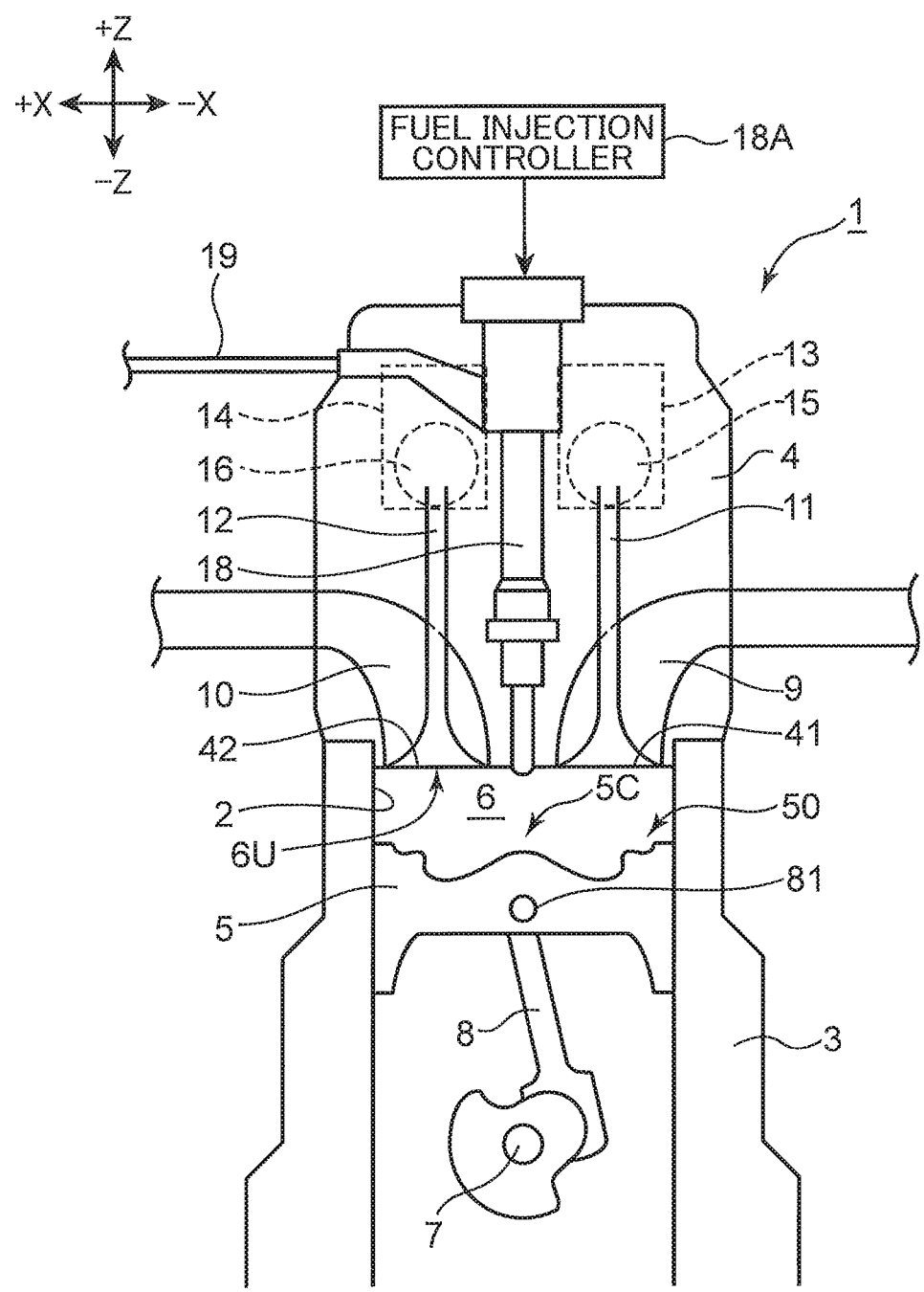
FIG. 1 is a schematic cross-sectional view, along a cylinder axial direction, illustrating an engine to which an engine combustion chamber structure according to an embodiment of the present invention is applied.

A diesel engine combustion chamber structure according to an embodiment of the present invention will be described below in detail with reference to the drawings. FIG. 1 is a schematic cross-sectional view illustrating an engine to which the engine combustion chamber structure according to the embodiment of the present invention is applied. The engine according to the embodiment includes a cylinder and a piston. The engine is a multicylinder engine mounted on a vehicle, such as a car, to serve as a driving power source for running the vehicle. The engine includes an engine body 1, an intake/exhaust manifold, and auxiliaries including various pumps. The intake/exhaust manifold and the auxiliaries are assembled to the engine body 1 and not shown in the drawings.

The engine body 1 includes a cylinder block 3, a cylinder head 4, and a piston 5. The cylinder block 3 includes a plurality of cylinders arrayed along a direction normal to the sheet on which FIG. 1 is drawn or a cylinder liner (hereinafter simply referred to as "cylinder 2", only one of which is drawn in the figure). The cylinder head 4 is attached to a top face of the cylinder block 3 to close an upper opening of the cylinder 2. The piston 5 is reciprocatably housed in each cylinder 2 and is connected to a crank shaft 7 via a connecting rod 8. As the piston 5 reciprocates, the crank shaft 7 is rotated about its central axis. The structure of the piston 5 will be described later.

A combustion chamber 6 is provided above the piston 5. The cylinder head 4 is provided with an intake port 9 and an exhaust port 10 which communicate with the combustion chamber 6. A bottom face of the cylinder head 4 is a combustion chamber ceiling face 6U. The combustion chamber ceiling face 6U has a flat shape extending in a horizontal direction. The combustion chamber ceiling face 6U is provided with an intake opening 41 located in a downstream end of the intake port 9, and an exhaust opening 42 located in an upstream end of the exhaust port 10. An intake valve 11 that opens and closes the intake opening 41 and an exhaust valve 12 that opens and closes the exhaust opening 42 are assembled to the cylinder head 4.

The intake valve 11 and the exhaust valve 12 are each what is called a puppet valve. The intake valve 11 includes an umbrella valve body that opens and closes the intake opening 41, and a stem vertically extending from the valve body. Similarly, the exhaust valve 12 includes an umbrella valve body that opens and closes the exhaust opening 42, and a stem vertically extending from the valve body. Each of the valve bodies of the intake valve 11 and the exhaust valve 12 has a valve face that faces the combustion chamber 6.

In the embodiment, a combustion chamber wall face that forms the combustion chamber 6 is formed by an inner wall face of the cylinder 2, a crown face 50, which is a top face (+Z face) of the piston 5, the combustion chamber ceiling face 6U, which is a bottom face of the cylinder head 4, and the valve faces of the intake valve 11 and the exhaust valve 12.

The cylinder head 4 is provided with an intake valve drive-mechanism 13 for driving the intake valve 11, and an exhaust valve drive-mechanism 14 for driving the exhaust valve 12. The valve drive-mechanisms 13 and 14 drive the intake valve 11 and the exhaust valve 12 in conjunction with rotation of the crank shaft 7. The intake valve 11 and the exhaust valve 12 are driven to open and close the intake opening 41 by the valve body of the intake valve 11 and open and close the exhaust opening 42 by the valve body of the exhaust valve 12.

An intake variable valve timing mechanism (intake VVT) 15 is assembled to the intake valve drive-mechanism 13. The intake VVT 15 is an electronic VVT provided for an intake cam shaft. The intake VVT 15 continuously changes a rotational phase of the intake cam shaft relative to the crank shaft 7 within a predetermined angle range and thereby changes the timing for opening and closing the intake valve 11. Similarly, an exhaust variable valve timing mechanism (exhaust VVT) 16 is assembled to the exhaust valve drive-mechanism 14. The exhaust VVT 16 is an electronic VVT provided for an exhaust cam shaft. The exhaust VVT 16 continuously changes a rotational phase of the exhaust cam shaft relative to the crank shaft 7 within a predetermined angle range and thereby changes the timing of opening and closing the exhaust valve 12.

An injector 18 (fuel injection valve) is attached to the cylinder head 4 (combustion chamber ceiling face 6U) of each cylinder 2. Fuel is injected into the combustion chamber 6 from a distal end of the injector 18. A fuel supply line 19 is connected to the injector 18. The injector 18 injects the fuel supplied through the fuel supply line 19 into the combustion chamber 6. In the embodiment, the injector 18 is assembled to the cylinder head 4 such that a nozzle 181 (FIG. 5) is positioned at or near a radial center of the combustion chamber 6. The injector 18 injects the fuel toward a cavity 5C (FIGS. 2 to 4B) provided in the crown face 50 of the piston 5. The cavity 5C will be described later.

A high pressure fuel pump (not shown) is connected to an upstream of the fuel supply line 19. The high pressure fuel pump is, for example, a plunger pump coupled to the crank shaft 7 to operate in conjunction with the crank shaft 7. A common rail (not shown) that is commonly used for every cylinder 2 to accumulate pressure is provided between the high pressure fuel pump and the fuel supply line 19. The fuel accumulated in the common rail is supplied to the injector 18 of each cylinder 2, and high pressure fuel is jetted from the injector 18 into the combustion chamber 6.

[Detail Structure of Piston]

A structure of the piston 5, especially a structure of the crown face 50 will be described in detail. FIG. 2 is a perspective view mainly illustrating an upper portion of the piston 5. The piston 5 includes a piston head in the upper side, and a skirt portion in the lower side. FIG. 2 illustrates a portion of the piston head having the crown face 50 on the top. FIG. 3 is a perspective view of the piston 5 with a radial cross-section. FIG. 4A is an enlarged view of the radial cross-section illustrated in FIG. 3. In FIGS. 3 and 4A, a cylinder axial direction A and a radial direction B of the combustion chamber are each indicated by an arrow.

The piston 5 includes a cavity 5C, a flat rim 55, and a circumferential side face 56. As described above, a portion (bottom face) of the combustion chamber wall face forming the combustion chamber 6 is the crown face 50 of the piston 5, and the cavity 5C is provided in the crown face 50. The cavity 5C is provided in the crown face 50 to be recessed in the cylinder axial direction A. The cavity 5C receives fuel injected from the injector 18. The flat rim 55 is an annular flat portion provided near an outer circumferential rim of the crown face 50 in the radial direction B. The cavity 5C is provided in a central region of the crown face 50 in the radial direction B, the central region not including the flat rim 55. The circumferential side face 56 slides against the inner wall face of the cylinder 2 and has a plurality of ring grooves which a piston ring (not shown) fits in.

The cavity 5C includes a first cavity 51, a second cavity 52, a connecting portion 53, and a hill portion 54. The first cavity 51 is a recess provided in the central region of the crown face 50 in the radial direction B. The second cavity 52 is an annular recess provided in the crown face 50 to be in an outer side of an outer circumference of the first cavity 51. The connecting portion 53 connects the first cavity 51 to the second cavity 52 along the radial direction B. The hill portion 54 is an umbrella protrusion provided at a center of the crown face 50 (the first cavity 51) in the radial direction B. The protruding hill portion 54 is provided just below the nozzle 181 of the injector 18 (FIG. 5).

The first cavity 51 includes a first upper end 511, a first bottom 512, and a first inner end 513. The first upper end 511 is a highest portion of the first cavity 51 and adjoins the connecting portion 53. The first bottom 512 is a lowest region of the first cavity 51 and has an annular shape in a top view. The first bottom 512 is a lowest region of the whole cavity 5C. The first cavity 51 has a predetermined depth (first depth) in the cylinder axial direction A at the first bottom 512. In a top view, the first bottom 512 is closely located in an inner side of the connecting portion 53 in the radial direction B.

A radial recess 514 that is curved to swell to the outer side in the radial direction B is provided between the first upper end 511 and the first bottom 512. The radial recess 514 has a portion recessed further to the outer side in the radial direction B than the connecting portion 53. The first inner end 513 is provided in a radially innermost of the first cavity 51. The first inner end 513 adjoins the lower end of the hill portion 54. The first inner end 513 and the first bottom 512 are connected by a curved face gradually becoming lower toward the radially outer side.

The second cavity 52 includes a second inner end 521, a second bottom 522, a second upper end 523, a tapered region 524, and a standing wall region 525. The second inner end 521 is provided in a radially innermost of the second cavity 52. The second inner end 521 adjoins the connecting portion 53. The second bottom 522 is a lowest region of the second cavity 52. The second cavity 52 has a depth (second depth) in the cylinder axial direction A at the second bottom 522, the depth being smaller than the depth at the first bottom 512. That is, the second cavity 52 is a recess located higher than the first cavity 51 in the cylinder axial direction A. The second upper end 523 is a highest portion of the second cavity 52 and located in the radially outer most of the second cavity 52. The second upper end 523 adjoins the flat rim 55.

The tapered region 524 extends from the second inner end 521 toward the second bottom 522 and has a shape becoming lower toward the radially outer side. As illustrated in FIG. 4A, the tapered region 524 has an inclination along a tilt line L2 that intersects at an angle α with a horizontal line L1 extending in the radial direction B. The standing wall region 525 is a wall face that rises somewhat steeply from the radially outer side of the second bottom 522. In a cross-sectional shape of the radial direction B, a wall face of the second cavity 52 is curved to extends from the second bottom 522 toward the second upper end 523, changing inclination from horizontal to vertical. A nearly vertical portion of the wall face near the second upper end 523 is the standing wall region 525.

In a cross-sectional shape of the radial direction B, the connecting portion 53 has a shape swelling to the radially inner side between the first cavity 51 in the lower side and the second cavity 52 in the upper side. The connecting portion 53 includes a lower end 531, a third upper end 532 (upper end, regarding the cylinder axial direction), and a middle portion 533 provided in the middle between the lower end 531 and the third upper end 532. The lower end 531 adjoins the first upper end 511 of the first cavity 51. The third upper end 532 adjoins the second inner end 521 of the second cavity 52.

In the cylinder axial direction A, the lower end 531 is the lowest portion of the connecting portion 53, and the third upper end 532 is a highest portion of the connecting portion 53. The tapered region 524 is also a region extending from the third upper end 532 toward the second bottom 522. The second bottom 522 is lower than the third upper end 532. That is, the second cavity 52 of the embodiment does not have a bottom face that horizontally extends to the outer side in the radial direction B from the third upper end 532. In other words, the third upper end 532 does not continue to the flat rim 55 via a horizontal face, and the second cavity 52 has the second bottom 522 that is further recessed than the third upper end 532.

The hill portion 54 protrudes upward to reach a height which is the same as the height of the third upper end 532 of the connecting portion 53 but is further recessed than the flat rim 55. The hill portion 54 is located at a center of the first cavity 51 having a circular shape in a top view. Thus, the first cavity 51 has the form of an annular groove provided around the hill portion 54.

[Curved Shape of Cavity]

Figure 4B:
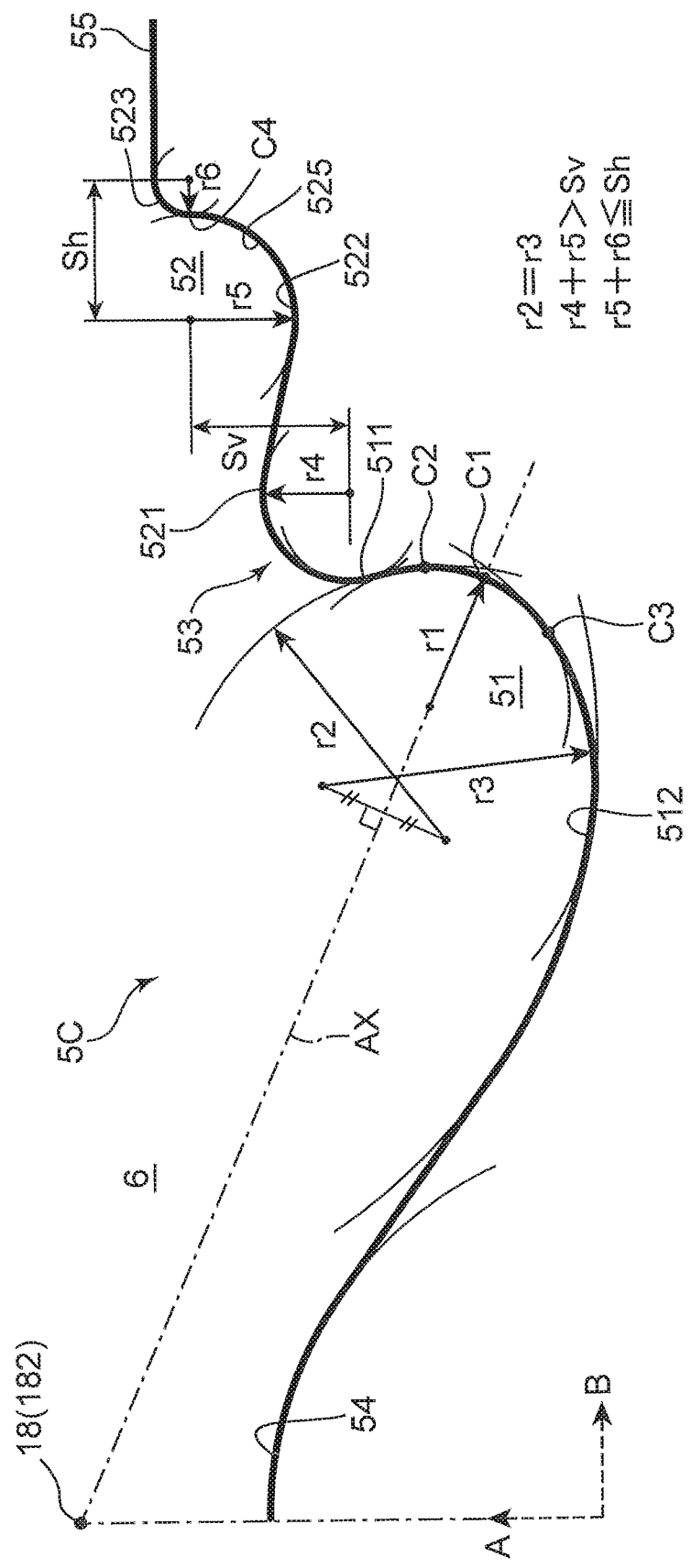
FIG. 4B is an explanatory view illustrating first and second cavities and a curved face of a connecting portion.

FIG. 4B is a cross-sectional view along the cylinder axial direction A for explaining the first and second cavities 51 and 52 and a curved shape of the connecting portion 53. The first cavity 51 has a shape curved along the egg curve of Descartes (hereinafter, referred to as egg-shape) in a cross-section including the cylinder axis. Specifically, the first cavity 51 includes a first section C1 which is an arc located farthermost from the injector 18 (injection hole 182), a second section C2 provided between the first section C1 and the connecting portion 53, and a third section C3 extending to the inner side in the radial direction B from the first section C1. When the shape is described with the shape illustrated in FIG. 4A, the first section C1 corresponds to the central region of the radial recess 514, the second section C2 corresponds to a region extending from the radial recess 514 to the first upper end 511, and the third section C3 corresponds to a region extending from the radial recess 514 to the first bottom 512.

In FIG. 4B, an injection axis AX of the fuel injected by the injector 18 intersects the first section C1 located most remote from the injector 18. The egg-shape of the first cavity 51 forms such an arc that has a smallest radius r1 in the first section C1 and a radius that gradually increases from the first section C1 toward the second section C2 and from the first section C1 toward the third section C3. That is, in the cross-section in FIG. 4B, a radius r2 of the second section C2 increases with the distance from the first section C1 along a counter-clockwise direction. A radius r3 of the third section C3 increases with the distance from the first section C1 along a clockwise direction at the same rate as the rate of the radius r2 of the second section C2 (r2=r3). Starting from the connecting portion 53, the egg-shape has a form of an arc of which radius decreases from the second section C2 to the first section C1 and increases from the first section C1 to the third section C3.

The connecting portion 53 has a convex shape formed of a curved face having a predetermined radius r4 in a region between the lower end 531 (the first upper end 511) and the third upper end 532 (the second inner end 521). The second cavity 52 has a concave shape formed of a curved face having a predetermined radius r5 in a region between the second bottom 522 and the standing wall region 525. The second upper end 523 has a convex shape formed of a curved face having a predetermined radius r6. The radiuses r4, r5, and r6 are selected to satisfy the following relationship:

$$r4+r5>Sv;\text{ and}$$

$$r5+r6 \leq Sh,$$

where Sv is a first distance along the cylinder axial direction A between a center of the radius r4 and a center of the radius r5, and Sh is a second distance along the radial direction B between a center of the radius r5 and a center of the radius r6.

A portion of the second cavity 52 from the second bottom 522 to an upper edge C4 of the standing wall region 525 is a near quarter-arc having the radius r5. The upper edge C4 of the standing wall region 525 adjoins the lower end of the second upper end 523 formed of a near quarter-arc having the radius r6. A top end of the second upper end 523 adjoins the flat rim 55. With such curved faces provided, the lower section of the standing wall region 525 is in the inner side, regarding the radial direction B, of the upper edge C4 of the standing wall region 525. In other words, the standing wall region 525 has no portion concaved to the outer side in the radial direction B like the radial recess 514 of the first cavity 51. The arc shape of the standing wall region 525, together with the egg-shape of the first cavity 51, prevents an excessive amount of the mixed gas from flowing back to the inner side of the combustion chamber 6 in the radial direction B and thereby causes combustion effectively using a space further in the radially outer side than the standing wall region 525 (squish space) in the radial direction B. This will be described in detail later.

[Spatial Separation of Fuel Injection]

Fuel injection by the injector 18 to the cavity 5C and the mixed gas flow after injection will now be described with reference to FIG. 5. FIG. 5 is a simplified cross-sectional view of the combustion chamber 6, illustrating the relationship between the crown face 50 (cavity 5C) and the injection axis AX of the fuel injected by the injector 18, and the arrows F11, F12, F13, F21, F22, and F23 schematically illustrating mixed gas flows after the injection.

The injector 18 includes the nozzle 181 disposed to project downward from the combustion chamber ceiling face 6U in the combustion chamber 6. The nozzle 181 has an injection hole 182 through which the fuel is injected into the combustion chamber 6. Although a single injection hole 182 is illustrated in FIG. 5, a plurality of injection holes 182 is actually arrayed at a constant pitch along the circumferential direction of the nozzle 181. The fuel injected from the injection hole 182 is directed along the injection axis AX in the figure. The injected fuel spreads at a spray angle θ. An upper spread axis AX1 indicating spreading to the upper side of the injection axis AX and a lower spread axis AX2 indicating spreading to the lower side of the injection axis AX are illustrated in FIG. 5. The spray angle θ is an angle between the upper spread axis AX1 and the lower spread axis AX2.

The fuel can be injected toward the connecting portion 53 of the cavity 5C from the injection hole 182. That is, the injection hole 182 is provided in the nozzle 181 to have the injection axis AX along which the fuel is injected toward the connecting portion 53 when the piston 5 is at a predetermined crank angle. FIG. 5 illustrates the positional relationship between the injection axis AX and the cavity 5C at the predetermined crank angle. The fuel injected from the injection hole 182 mixes with the air in the combustion chamber 6 to form a mixed gas and collides with the connecting portion 53.

The tapered region 524 of the second cavity 52 is a face having an inclination along the injection axis AX. The inclination along the injection axis AX includes the same or approximately the same inclination as the inclination of the injection axis AX from the horizontal line L1 along the radial direction B (FIG. 4A). For example, the tapered region 524 may be an inclined face having the same inclination or approximately the same inclination as the inclination of the upper spread axis AX1 or the lower spread axis AX2.

As illustrated in FIG. 5, the fuel injected toward the connecting portion 53 along the injection axis AX collides with the connecting portion 53 and then spatially separates into a flow (indicated by the arrow F11) that flows toward the first cavity 51 (to the lower side) and a flow (indicated by the arrow F21) that flows toward the second cavity 52 (to the upper side). That is, the fuel injected toward the middle portion 533 of the connecting portion 53 separates into the upper flow and the lower flow which then mix respectively with the air existing in the first cavity 51 and the air existing in the second cavity 52. The mixed flows respectively flow along the face of the cavities 51 and 52.

To describe in detail, the mixed gas flowing in the direction indicated by the arrow F11 (to the lower side) flows to the lower side from the lower end 531 of the connecting portion 53 into the radial recess 514 of the first cavity 51. The curved shape of the radial recess 514 changes the flow direction of the mixed gas to flow to the lower side and then to the inner side, regarding the radial direction B, and the mixed gas flows along the bottom shape of the first cavity 51 having the first bottom 512 as indicated by the arrow F12. While flowing in such a manner, the mixed gas mixes with the air in the first cavity 51 and reduces its concentration.

With the hill portion 54 provided, the bottom of the first cavity 51 rises toward the radial center. Thus, the mixed gas flowing along the direction indicated by the arrow F12 rises and eventually flows by the combustion chamber ceiling face 6U to the radially outer side as indicated by the arrow F13. While flowing in such a manner, the mixed gas also mixes with the air still existing in the combustion chamber 6 to form a uniform, lean mixed gas.

The egg-shape of the first cavity 51 described with reference to FIG. 4B also contributes to smooth creation of the flows indicated by the arrows F11 to F13. The arc shape formed by the second section C2, the first section C1, and the third section C3 sequentially continuing along the clockwise direction causes the mixed gas to suitably flow without stagnating in the first cavity 51. That is, the mixed gas (in-cylinder flow) that flows from the connecting portion 53 toward the first section C1 via the second section C2 is accelerated as the radius of the arc decreasing toward the first section C1. This promotes the flow indicated by the arrow F11.

Meanwhile, the radius of the arc increases from the first section C1 toward the third section C3. Thus, the mixed gas is decelerated at the third section C3 and guided to the radially inner side. That is, the mixed gas is not disturbed by steeply flowing to the upper side. As indicated by the arrow F12, the mixed gas flows to the upper side after flowing along the first bottom 512. In a later stage of combustion, the descending piston 5 causes a reverse squish flow toward the outer side in the radial direction B at the flat rim 55. In addition to the effect by the egg-shape of the first cavity 51, the reverse squish flow induces the mixed gas to flow to the outer side in the radial direction B as indicated by the arrow F13. With such a flow created, stagnation of the mixed gas in the first cavity 51 is suppressed.

Meanwhile, the mixed gas flowing in the direction (to the upper side) indicated by the arrow F21 flows from the third upper end 532 of the connecting portion 53 to the tapered region 524 of the second cavity 52, and then flows diagonally to the lower side along the inclination of the tapered region 524. As indicated by the arrow F22, the mixed gas arrives at the second bottom 522. Since the tapered region 524 is a face having an inclination along the injection axis AX, the mixed gas smoothly flows to the radially outer side. With the tapered region 524 and the second bottom 522 that is located lower than the third upper end 532 of the connecting portion 53 provided, the mixed gas arrives at the radially further outer side in the combustion chamber 6.

Then, the mixed gas rises by the rising curved face between the second bottom 522 and the standing wall region 525 to flow from the combustion chamber ceiling face 6U to the radially inner side. The mixed gas flowing along the arrow F22 mixes with the air in the second cavity 52 to form a uniform, lean mixed gas. The standing wall region 525 extending in an approximately vertical direction and provided further in the radially outer side than the second bottom 522 prevents the injected fuel (the mixed gas) from arriving at the inner circumferential wall (at which a liner (not shown) is typically provided) of the cylinder 2. That is, with the second bottom 522 provided, the mixed gas flow nearly arrives at the radially outer side of the combustion chamber 6. However, with the standing wall region 525 provided, interference between the mixed gas and the inner circumferential wall of the cylinder 2 is suppressed. Thus, the cooling loss caused by the interference is suppressed.

The lower section of the standing wall region 525 is provided further in the inner side than the upper edge C4 in the radial direction B. This prevents the flow indicated by the arrow F22 from having an excessively large momentum, so that flowing of an excessive amount of the mixed gas back to the inner side in the radial direction B is prevented. If the momentum of the flow indicated by the arrow F22 is too large, a partially combusted mixed gas collides with a fresh fuel that is injected later and not yet spread enough, which discourages uniform combustion and thereby produces emission, such as soot. The shape of the standing wall region 525 of the embodiment is not concaved to the radially outer side, which moderates the flow indicated by the arrow F22 and also creates a flow toward the outer side, regarding the radial direction B, as indicated by the arrow F23. In particular, the flow indicated by the arrow F23 is likely to be induced with the help by the reverse squish flow in a later stage of combustion. Accordingly, the space further in the radially outer side than the standing wall region 525 (squish space above the flat rim 55) can effectively be used to perform combustion. This suppresses soot emission, for example, and realizes combustion effectively using the whole space of the combustion chamber.

As described above, the fuel injected toward the connecting portion 53 along the injection axis AX collides with the connecting portion 53 to spatially separate, and the separated flows form mixed gases respectively using the air existing in the spaces of the first and second cavities 51 and 52. Creating a uniform, lean mixed gas throughout the space in the combustion chamber 6, production of emission such as soot, is suppressed during combustion.

[Chronological Separation of Fuel Injection]

Figure 6:
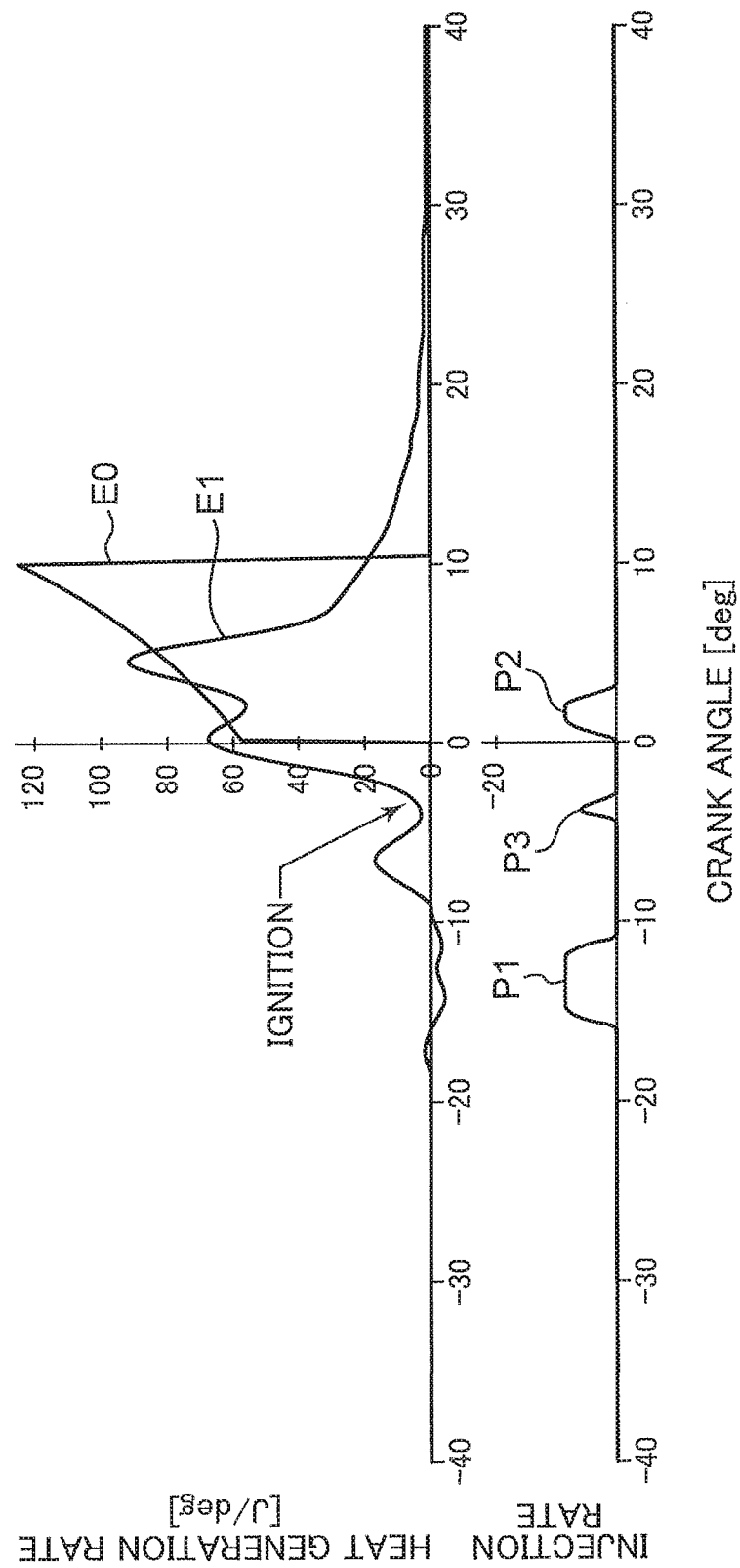
FIG. 6 is a time chart illustrating a timing of fuel injection and a heat generation rate for a case where the cavity according to the embodiment of the present invention is used.

In the embodiment, an example of effectively using the air in the combustion chamber 6 by chronologically separating the fuel injection in addition to the spatial separation of the fuel injection as described above will be described. FIG. 6 is a time chart illustrating an example of a timing of fuel injection from the injector 18 to the cavity 5C and a heat generation rate property E1 at the timing of the fuel injection. An ideal property E0 of the heat generation rate is also illustrated in FIG. 6. The ideal property E0 is the heat generation rate for a condition under a high degree of constant volume and a short combustion time (about a crank angle CA of 10 degrees). The spatial separation of the fuel injection described above and the chronological separation of the fuel injection described here are ideas to obtain a heat generation rate property E1 close to the ideal property E0 as possible.

Fuel injection by the injector 18 is controlled by a fuel injection controller 18A (see FIG. 1). The fuel injection controller 18A of the embodiment causes the injector 18 to perform three fuel injections during a cycle, which are a pilot injection P1, a main injection P2, and a pre-injection P3.

The main injection P2 is a fuel injection performed at a timing when the piston 5 is near a top dead center (TDC) of compression. FIG. 6 illustrates an example where the main injection P2 is performed at a timing slightly delayed from the TDC. The pilot injection P1 is a fuel injection performed at a timing earlier than the timing of the main injection P2 and the timing of the TDC. FIG. 6 illustrates an example in which the pilot injection P1 is performed while the crank angle CA is from −16 degrees to −12 degrees. The pilot injection P1 and the main injection P2 have the same peak value of fuel injection rate, but a period of fuel injection is set longer for the pilot injection P1. The pre-injection P3 is a fuel injection performed between the pilot injection P1 and the main injection P2 to inject a small amount of fuel. The pre-injection P3 is performed to reduce a valley (a valley observed for the crank angle CA of 2 degrees to 3 degrees) between the peaks in the heat generation rate property E1 as much as possible in order to suppress noise. But the pre-injection P3 may be omitted.

The fuel injection toward the connecting portion 53 described above is performed in the pilot injection P1. That is, the injection hole 182 of the injector 18 has the injection axis AX along which the fuel is injected toward the connecting portion 53 at a crank angle at which the pilot injection P1 is performed. The main injection P2 is a fuel injection performed to create another mixed gas using the air remaining in a space between the two separated mixed gas flows after the fuel (mixed gas) injected by the pilot injection P1 has spatially separated into the upper flow and the lower flow as illustrated in FIG. 5. That is, at a timing when the fuel supplied by a first fuel injection (pilot injection P1) has separated and entered the first and second cavities 51 and 52 to be spatially separated from each other, namely, at a timing chronologically different from the timing of the first injection, the fuel injection controller 18A performs a second fuel injection (main injection P2) to use the air existing between the upper mixed gas and the lower mixed gas (chronological separation of fuel injection).

[Creation of Mixed Gas in Combustion Chamber]

With both the spatial separation and chronological separation of fuel injection, further uniform, lean mixed gas can be created in the combustion chamber. This will be described with reference to FIGS. 7A to 7D. FIGS. 7A to 7D are schematic diagrams illustrating creation of mixed gas in the combustion chamber 6 of the embodiment with reference to the crank angle CA. FIGS. 7A, 7B, 7C, and 7D illustrate creation of mixed gas respectively at crank angles CA of −11 degrees, 3 degrees, 4 degrees, and 20 degrees. Portions colored dark in FIGS. 7A, 7B, 7C, and 7D indicate portions of the mixed gas having a high fuel concentration.

Figure 7A:
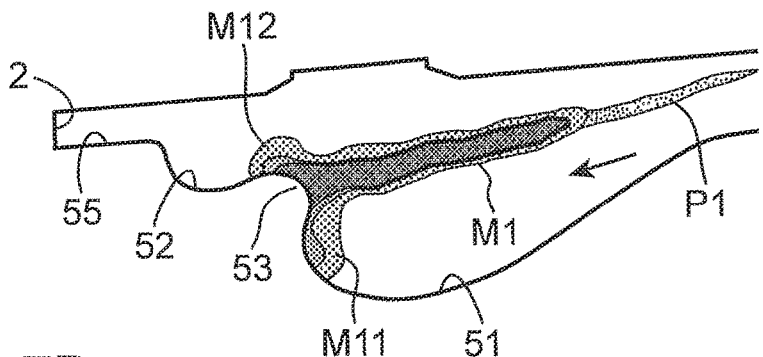
FIGS. 7A to 7D are schematic diagrams illustrating creation of a mixed gas in the combustion chamber with reference to a crank angle.

FIG. 7A illustrates a state in the combustion chamber 6 at a timing of crank angle CA=−11 degrees corresponding to the timing of the end of the pilot injection P1 (FIG. 6). The fuel is injected toward the connecting portion 53 of the cavity 5C by the pilot injection P1. The fuel injected by the pilot injection P1 mixes with the air in the combustion chamber 6 to form a first mixed gas M1 and collides with the connecting portion 53. At this state, the first mixed gas M1 is not yet sufficiently spread and the fuel concentration is still high. Colliding with the connecting portion 53, the first mixed gas M1 separates into a lower mixed gas M11 that flows toward the first cavity 51 and an upper mixed gas M12 that flows toward the second cavity 52. This is the spatial separation of the mixed gas described above.

Figure 7B:
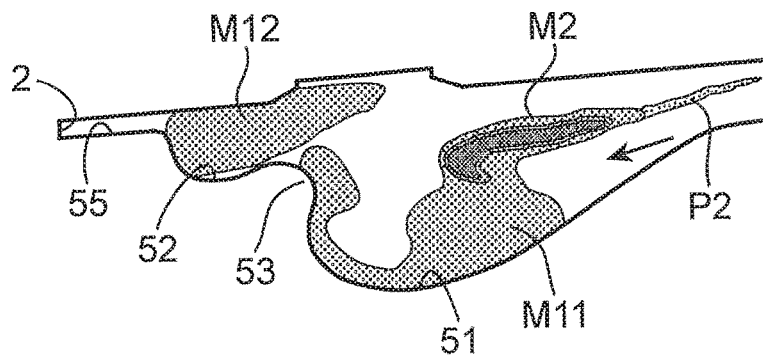

FIG. 7B illustrates a state in the combustion chamber 6 at a timing of crank angle CA=3 degrees corresponding to the timing of the end of the main injection P2 (FIG. 6). At this timing, the piston 5 is approximately at the TDC, so that the fuel is injected toward around a lower portion of the connecting portion 53 by the main injection P2. The lower mixed gas M11 and the upper mixed gas M12 created by the previously performed pilot injection P1 respectively enter the first cavity 51 and the second cavity 52 and each mixes with the air in each space and becomes thinner. Just before the start of the main injection P2, fresh air (not mixed with the fuel) exists between the lower mixed gas M11 and the upper mixed gas M12. The egg-shape of the first cavity 51 contributes to creation of a fresh air layer. The fuel injected by the main injection P2 flows between the lower mixed gas M11 and the upper mixed gas M12 and mixes with the fresh air to form a second mixed gas M2.

Figure 7C:
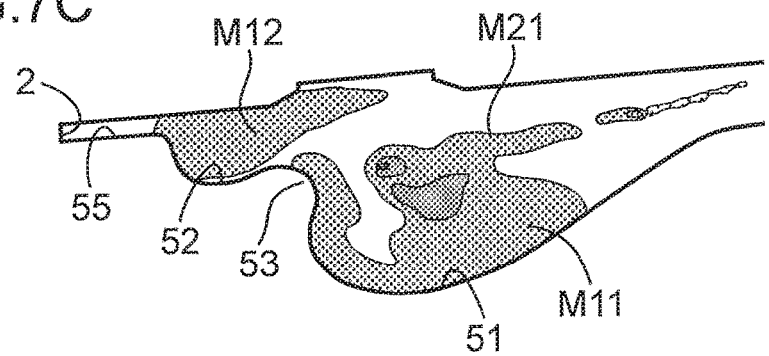

FIG. 7C illustrates a state in the combustion chamber 6 where the crank angle has advanced from the state in FIG. 7B by 1 degree. The lower mixed gas M11 and the upper mixed gas M12 have further spread and their areas have become large. It can be understood that the second mixed gas M2 has formed into a mixed gas M21 having a lower concentration by mixing with the fresh air between the lower mixed gas M11 and the upper mixed gas M12. This is the chronological separation of the fuel injection.

There are two effects to be focused. First, the fuel injected by the pilot injection P1 and the fuel injected by the main injection P2 do not interfere with each other in the combustion chamber 6 and form the mixed gases. That is, the fuel is injected by the main injection P2 not additionally into the spaces where the lower mixed gas M11 and the upper mixed gas M12 already exist but into the space between the mixed gases M11 and M12. The mixed gas M21 is created by effectively using the space (air) in the combustion chamber 6. Second, the upper mixed gas M12 does not arrive at the inner circumferential wall of the cylinder 2. This is realized by the shape of the second cavity 52 provided with the standing wall region 525, which shape discourages the upper mixed gas M12 from arriving at the flat rim 55. This contributes to suppressing of cooling loss.

Figure 7D:
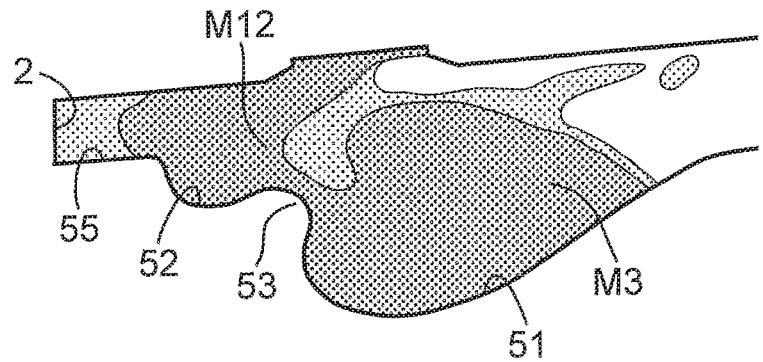

FIG. 7D illustrates a state in the combustion chamber 6 at a timing of crank angle CA=20 degrees corresponding to the timing of the end of combustion. With the inject created by the main injection P2 facilitating the flow, the lower mixed gas M11 and the upper mixed gas M12 created by the pilot injection P1 and the mixed gas M21 created by the main injection P2 suitably mix with each other to form a combined mixed gas M3. It can be understood that the uniform, lean combined mixed gas M3 widely spread in the combustion chamber 6 is created. Accordingly, combustion that produces little soot is performed.

Comparison with Comparative Example

To evaluate the piston 5 including the cavity 5C according to the embodiment, Comparative Example 1 and Comparative Example 2 will be described.

First Comparative Example

Figure 8:
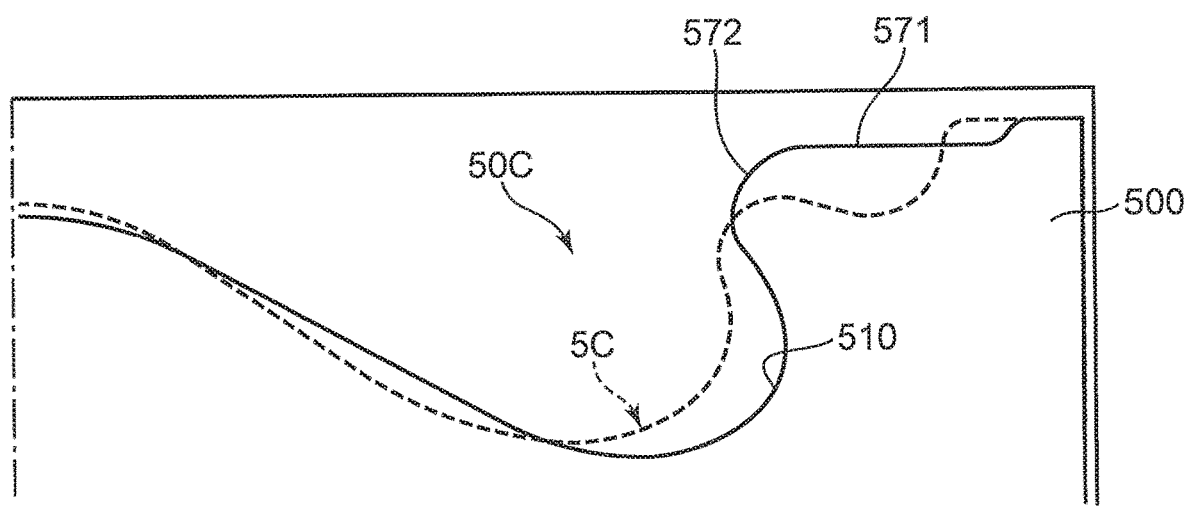
FIG. 8 is a cross-sectional view illustrating a structure of a cavity of Comparative Example 1.

FIG. 8 is a cross-sectional view of a piston 500 including a cavity 50C according to Comparative Example 1. A cross-sectional shape of the cavity 5C of the embodiment is illustrated in a dotted line. The cavity 50C of Comparative Example 1 includes a cavity 510 which is a recess provided in a radially central region of the piston 500, a flat face 571 provided in a radially outer region, and a lip 572 provided between the cavity 510 and the flat face 571.

In short, the cavity 50C of Comparative Example 1 has a form of the embodiment but without the second cavity 52. That is, the cavity 50C is different from the cavity 5C of the embodiment in that there is no portion lower than the lip 572 (corresponding to the connecting portion 53 of the embodiment) in a radially outer side of the lip 572.

Figure 9:
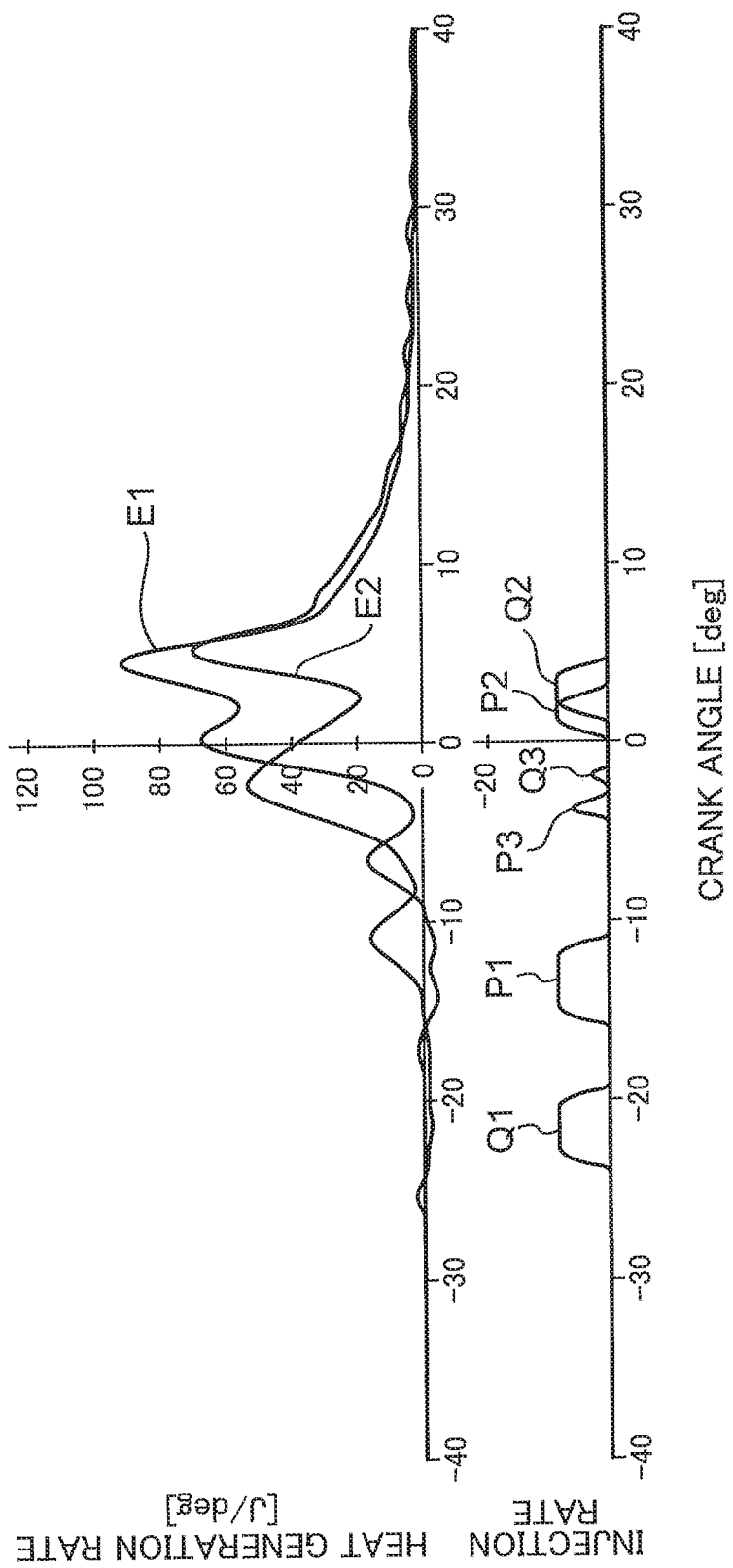
FIG. 9 is a time chart in which a timing of fuel injection and a heat generation rate for a case where a cavity according to Comparative Example 1 is used are superposed on the time chart in FIG. 6.

FIG. 9 is a time chart in which a timing of fuel injection and a heat generation rate for a case where a cavity 50C according to Comparative Example 1 is used are superposed on the time chart in FIG. 6. Like in the embodiment, three fuel injections, that is, a pilot injection Q1, a main injection Q2, and a pre-injection Q3 are performed in a cycle in Comparative Example 1. Since the cavity 50C has no second cavity 52, the lip 572 is higher than the connecting portion 53 of the embodiment. Thus, a timing of the start of the pilot injection Q1 is set earlier by the crank angle CA of 8 degrees than the timing of the pilot injection P1 of the embodiment, and the injection axis AX is directed to the lip 572. A timing of the start of the main injection Q2 is set somewhat later than the timing of the main injection P2.

Figure 10A:
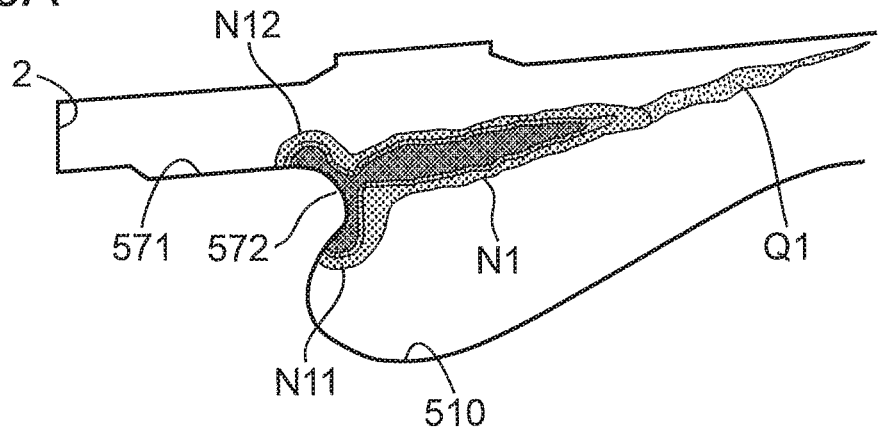
FIGS. 10A to 10C are schematic diagrams illustrating creation of a mixed gas in a combustion chamber of Comparative Example 1.
Figure 10B:
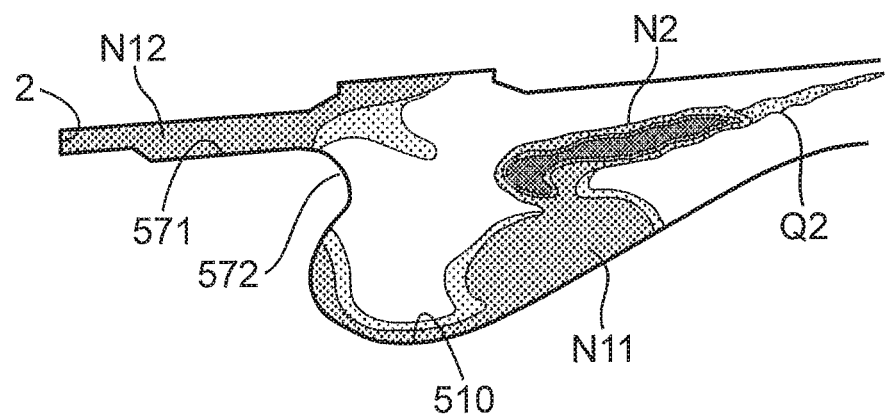
Figure 10C:
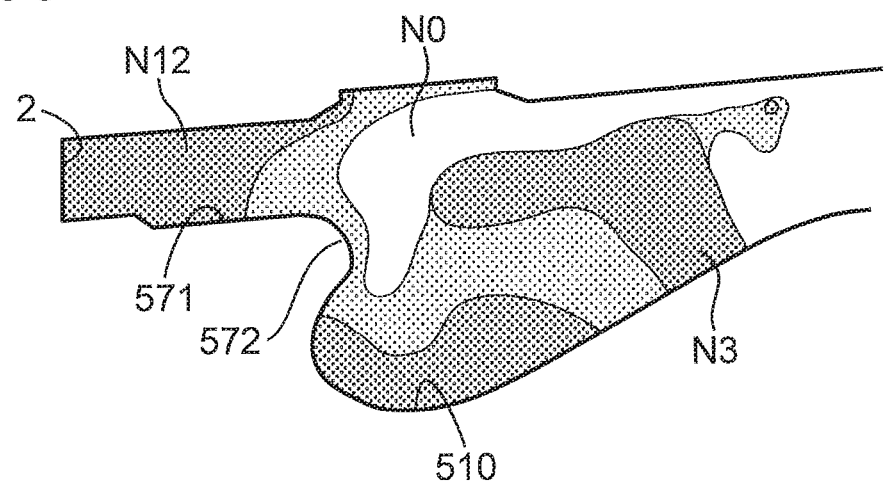

FIGS. 10A to 10C schematically illustrate creation of a mixed gas in the combustion chamber 6 for a case where the cavity 50C of Comparative Example 1 is used. FIG. 10A illustrates a state in the combustion chamber when the pilot injection Q1 is performed. The fuel is injected toward the lip 572 of the cavity 50C by the pilot injection Q1. The fuel injected by the pilot injection Q1 mixes with the air in the combustion chamber to form a first mixed gas N1 and collides with the lip 572. The first mixed gas N1 separates into a lower mixed gas N11 that flows toward the cavity 510 and an upper mixed gas N12 that flows toward the upper side.

FIG. 10B illustrates a state in the combustion chamber at a timing of the end of the main injection Q2. At this timing, the piston 5 is approximately at the TDC, so that the fuel is injected by the main injection Q2 toward the cavity 510 located lower than the lip 572. The fuel injected by the main injection Q2 becomes a second mixed gas N2. Such a flow indicated by the arrow F22 in FIG. 5 is not created since there is no second cavity 52 as in the embodiment. Thus, the upper mixed gas N12 created by the previously performed pilot injection Q1 intrudes deeply into a region between the flat face 571 and the top face of the combustion chamber (squish area). Thus, the upper mixed gas N12 interferes with the inner circumferential wall of the cylinder 2 and causes cooling loss.

FIG. 10C illustrates a state in the combustion chamber at a timing corresponding to the timing of the end of combustion. The second mixed gas N2 created by the main injection Q2 and the lower mixed gas N11 created by the pilot injection Q1 mix with each other to form a combined mixed gas N3. However, the upper mixed gas N12 and the combined mixed gas N3 do not fully mix with each other, so that an air layer NO (or a mixed gas having a very low fuel concentration) exists between the upper mixed gas N12 and the combined mixed gas N3. Thus, sufficiently uniform, lean mixed gas is not yet created in the combustion chamber.

As is clear from comparison with Comparative Example 1, use of the cavity 5C of the embodiment discourages interference between the inner circumferential wall of the cylinder 2 and the mixed gas, and thereby cooling loss is suppressed and the flow in the combustion chamber 6 is facilitated to form a uniform, lean mixed gas. It is clear from FIG. 9 that, according to the embodiment, a fuel spray period (period from the start of the pilot injection P1 to the end of the main injection P2) can be set shorter than the spray period of Comparative Example 1 (from the start of the pilot injection Q1 to the end of the main injection Q2). The progress of the crank angle during the progress of combustion from 10% to 90% was 20.3 degrees for Comparative Example 1 but was a shorter 15.9 degrees for the embodiment. This confirms that fuel consumption improves by using the cavity 5C of the embodiment.

Second Comparative Example

Figure 11:
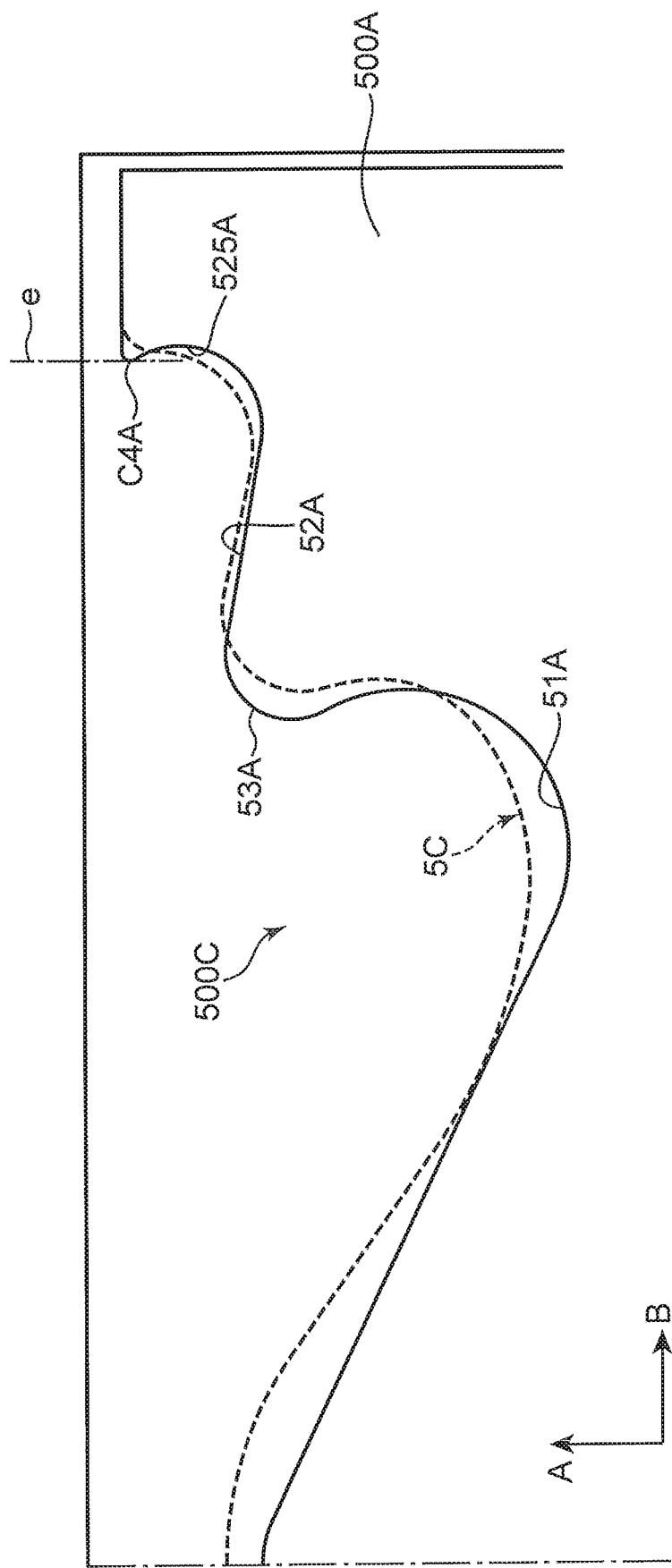
FIG. 11 is a cross-sectional view illustrating a structure of a cavity of Comparative Example 2.

FIG. 11 is a cross-sectional view illustrating a structure of a cavity 500C of Comparative Example 2. In FIG. 11, a cross-sectional shape of the cavity 5C of the embodiment is illustrated in a dotted line. The cavity 500C of Comparative Example 2 includes a first cavity 51A which is a recess provided in a radially central region of the piston 500A, a second cavity 52A provided in an outer region of the first cavity 51A in the radial direction B, and a connecting portion 53A connecting the cavities 51A and 52A. A standing wall region 525A is provided in an outer side of the bottom of the second cavity 52A in the radial direction B. That is, the cavity 500C of Comparative Example 2 has the same components as the cavity 5C of the embodiment.

The cavity 500C is different from the cavity 5C of the embodiment in the shape of the standing wall region 525A. A lower section of the standing wall region 525A is provided to be in the outer side, regarding the radial direction B, of an upper edge C4A of the standing wall region 525A. That is, the standing wall region 525A is concaved to the outer side in the radial direction B beyond a vertical line e that is tangent to the upper edge C4A.

Figure 12A:
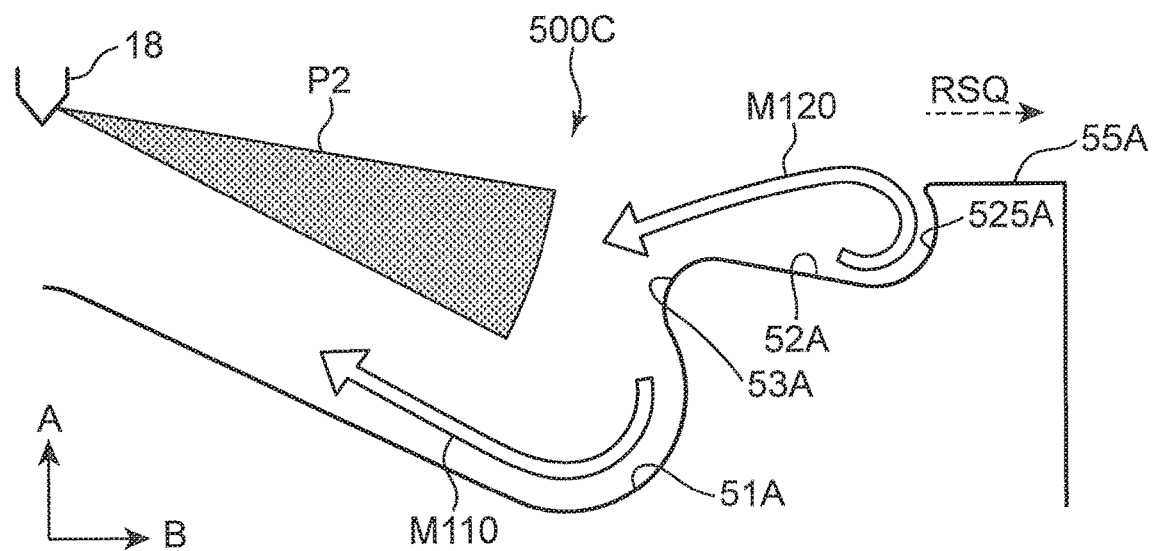
FIG. 12A illustrates an in-cylinder flow of Comparative Example 2.
Figure 12B:
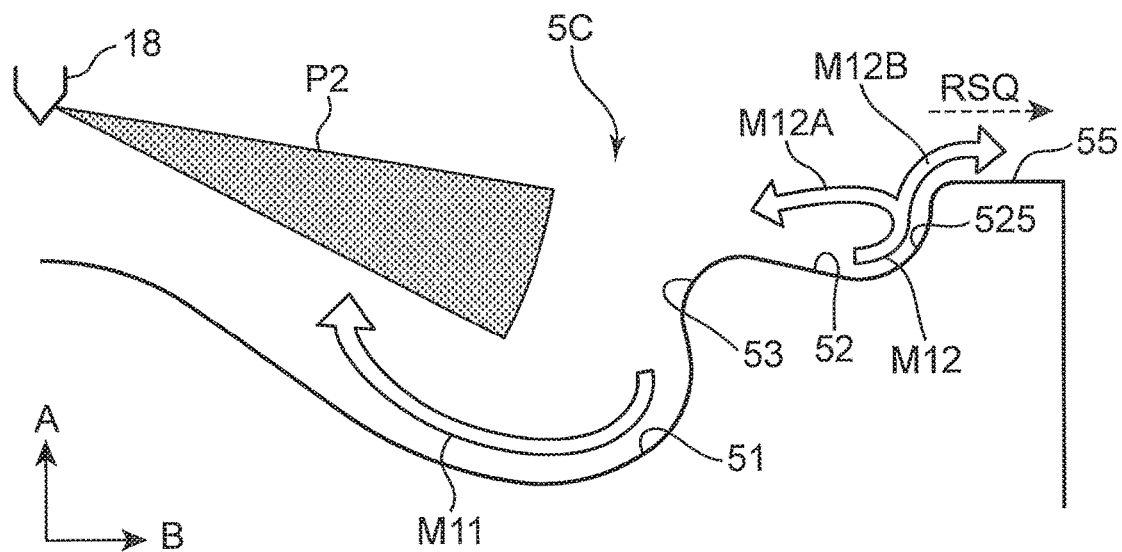
FIG. 12B illustrates an in-cylinder flow of the embodiment.

FIG. 12A illustrates an in-cylinder flow for a case where the cavity 500C of Comparative Example 2 is used. FIG. 12B illustrates an in-cylinder flow for a case where the cavity 5C of the embodiment is used. Timings illustrated in FIGS. 12A and 12B correspond to the timing when the main injection P2 in FIG. 7B is performed. When the pilot injection P1 is performed toward the connecting portion 53A of the cavity 500C of Comparative Example 2, the mixed gas separates into a lower mixed gas M110 that flows toward the first cavity 51A and an upper mixed gas M120 that flows toward the second cavity 52A.

The lower mixed gas M110 flows toward the inner side in the radial direction B along the face of the first cavity 51A. The upper mixed gas M120 flows toward the outer side in the radial direction B along the face of the second cavity 52A and then collides with the standing wall region 525A, thereby changing the flow direction. With the standing wall region 525A having an arc shape concaved to the outer side in the radial direction B, the upper mixed gas M120 turns back swiftly along this arc shape to be directed toward the inner side in the radial direction B. An assist given by a reverse squish flow RSQ created when the piston 5 descends has little effect on the upper mixed gas M120.

The upper mixed gas M120 collides with the fuel injected by the main injection P2. That is, the fuel injected by the main injection P2 collides with the upper mixed gas M120 before thoroughly spreading in the combustion chamber 6. At this stage, a portion of the upper mixed gas M120 burns into a flame, causing combustion before the injected fuel creates a uniform mixed gas by the collision. This may produce emission, such as soot.

The cavity 5C including the standing wall region 525 having a shape according to the embodiment however can solve the above problem. By performing the pilot injection P1 toward the connecting portion 53 of the cavity 5C, the mixed gas separates into a lower mixed gas M11 that flows toward the first cavity 51 and an upper mixed gas M12 that flows toward the second cavity 52. The lower and upper mixed gases M11 and M12 flow respectively along the face of the first cavity 51 and the face of the second cavity 52. The standing wall region 525 has such a shape that the lower section of the standing wall region 525 is located further in the inner side than the upper edge C4 in the radial direction B. More specifically, the standing wall region 525 has a curved face of a near quarter-arc having the radius r5 from the second bottom 522 of the second cavity 52 to the upper edge C4.

The upper mixed gas M12 thus rises in the cylinder axial direction A, not turning back swiftly toward the inner side in the radial direction B, like in Comparative Example 2. The upper mixed gas M12 then separates into an inward component M12A that flows to the inner side in the radial direction B, and an outward component M12B that flows toward the outer side in the radial direction B. The reverse squish flow RSQ contributes to creation of the outward component M12B. The inward component M12A does not flow swiftly enough to collide with the fuel injected by the main injection P2, so that the inward component M12A does not hinder much a circulation flow of the lower mixed gas M11 (flow toward the outer side, regarding the radial direction B, indicated by an arrow F13 in FIG. 5) caused by the egg-shape of the first cavity 51 and the reverse squish flow RSQ. According to the embodiment as described above, the interactive effect of the egg-shape of the first cavity 51 and the shape of the standing wall region 525 of the second cavity 52 causes spreading of the mixed gas in the whole space of the combustion chamber 6.

[Preferable Scene to Perform Pilot Injection]

The fuel injection control performed by the fuel injection controller 18A illustrated in FIG. 6 can be used for pre-mixed compression ignited (PCI) combustion in a diesel engine as the engine body 1. In this case, the fuel injection controller 18A preferably performs the fuel injection including the pilot injection P1 in an operating range where the engine body 1 operates under a middle load. For example, the middle load in the operating range is a load where the engine rotational speed is 2000 rpm and BMEP is 600 kPa.

An effect by the spatial separation of the mixed gas tends to be insufficient when an amount of fuel injected by the injector 18 is large (high-load) or small (low-load). Under a high-load, the created mixed gas tends to have a high fuel concentration. This is because the volume of the first cavity 51 is not large enough for a fuel amount, that is, the volume of the first cavity 51, resulting from separating the cavity 5C into two cavities 51 and 52, is small. In this case, a region with a high concentration is locally created in the mixed gas in the combustion chamber 6 and may produce soot. Meanwhile, under a low-load, ignition performance tends to be low. This is because the fuel concentration of the mixed gas in the spaces of the first and second cavities 51 and 52 are too low. Accordingly, the fuel injection control including the pilot injection P1 is preferably performed in an operating scene of the middle load where the chances of the above described tendency is low.

[Effect]

In the engine combustion chamber structure according to the embodiment described above, the cavity 5C provided in the crown face 50 of the piston 5 has a two-stage structure having the first cavity 51 in the central region, regarding the radial direction B, and the second cavity 52 that is provided in the outer side, regarding the radial direction B, of the outer circumference of the first cavity 51 and has a smaller depth in the cylinder axial direction A. Furthermore, the second bottom 522 of the second cavity 52 is lower than the third upper end 532 of the connecting portion 53 connecting the cavities 51 and 52. When fuel is injected from the injector 18 toward the cavity 5C, the fuel mixes with the air in the combustion chamber, and the mixed gas flows toward the second bottom 522, that is, the mixed gas can easily flow toward the radially outer side of the combustion chamber 6. Effectively using the air in the combustion chamber 6, a uniform, lean mixed gas is created and production of emission, such as soot, is suppressed.

In addition, the second cavity 52 is provided with the standing wall region 525. The standing wall region 525 provided in the structure discourages the mixed gas from easily arriving at the inner circumferential wall of the cylinder 2 but still allows some portion of the mixed gas to flow toward the outer side in the radial direction B. The lower section of the standing wall region 525 is located further in the inner side than the upper edge C4 of the standing wall region 525 in the radial direction B. This reduces cooling loss and, at the same time, prevents an excessive amount of the mixed gas from flowing back to the inner side of the combustion chamber 6 in the radial direction B. Thus, the space further in the radially outer side than the standing wall region 525 (squish space) is effectively used to perform combustion. A flow resulting from the egg-shape of the first cavity 51 also contributes to effective use of the squish space.

The fuel is injected from the injection hole 182 of the injector 18 toward the connecting portion 53, and the mixed gas collides with the connecting portion 53 to spatially separate into the lower mixed gas M11 that flows toward the first cavity 51 and the upper mixed gas M12 that flows toward the second cavity 52. Mixed gases are created respectively using the air existing in the first cavity 51 and the air existing in the second cavity 52.

Furthermore, the fuel injection controller 18A causes the injector 18 to perform the main injection P2 to inject fuel near TDC and the pilot injection P1 to inject fuel toward the connecting portion 53 at a timing earlier than the timing of the main injection P2. The fuel injected by the main injection P2 forms another mixed gas, which is the second mixed gas M2, using the air existing between the spatially separated lower mixed gas M11 that has entered the first cavity 51 and the upper mixed gas M12 that has entered the second cavity 52. That is, in a manner chronologically separated from the pilot injection P1, the main injection P2 uses the air existing in the combustion chamber 6 to create the mixed gas. Accordingly, a further uniform, lean mixed gas can be created in the combustion chamber 6.

Finally, a feature and an effect based on the feature disclosed for the embodiment will be described.

An engine combustion chamber structure according to an aspect of the present invention includes a combustion chamber of an engine, the combustion chamber being formed by a lower face of a cylinder head, a cylinder, and a crown face of a piston, and a fuel injection valve that injects fuel into the combustion chamber, where the crown face of the piston is provided with a cavity, the fuel injection valve injects fuel toward the cavity and is disposed at or near a radial center of the combustion chamber, the cavity includes a first cavity that is provided in a radially central region of the crown face and includes a first bottom having a first depth in a cylinder axial direction, a second cavity that is provided in the crown face to be in an outer side of an outer circumference of the first cavity and includes a second bottom having a second depth in the cylinder axial direction, the second depth being smaller than the first depth, a connecting portion that connects the first cavity to the second cavity, and a standing wall region disposed further in a radially outer side than the second bottom of the second cavity, the second bottom is provided lower than an upper end, regarding a cylinder axial direction, of the connecting portion, and a lower section of the standing wall region is provided further in a radially inner side than an upper edge of the standing wall region.

In the combustion chamber structure, a cavity provided in a crown face of a piston has a two-stage structure having a first cavity in a radially central region of the crown face, and a second cavity that is provided in an outer side, regarding the radial direction, of an outer circumference of the first cavity and has a smaller depth in a cylinder axial direction than the first cavity. Furthermore, a second bottom of the second cavity is lower than an upper end of a connecting portion connecting the two cavities. When fuel is injected from a fuel injection valve disposed at or near a radial center of the combustion chamber toward the cavity, the fuel mixes with air in the combustion chamber, and the mixed gas flows toward the second bottom, that is, the mixed gas can easily flow toward a radially outer side of the combustion chamber. According to the combustion chamber structure, the air in the combustion chamber is effectively used to create a uniform, lean mixed gas, and production of emission, such as soot, is suppressed.

A standing wall region is provided further in the radially outer side than the second bottom of the second cavity. The standing wall region provided in the structure discourages the mixed gas from easily arriving at the inner circumferential wall of the cylinder and reduces cooling loss. A lower section of the standing wall region is located further in a radially inner side than the upper edge of the standing wall region. This prevents an excessive amount of the mixed gas from flowing back to the radially inner side of the combustion chamber. Thus, a space further in the radially outer side than the standing wall region (squish space) is effectively used to perform combustion.

When the lower section of the standing wall region is formed as a second cavity that is concaved to the outer side and includes a portion located further in the radially outer side than the upper edge, an in-cylinder flow is created along the concave shape. This in-cylinder flow has a large momentum to flow back toward the radially inner side. This causes the fuel injected from the fuel injection valve to collide, before thoroughly spreading in the combustion chamber, with the in-cylinder flow entailing combustion, which discourages a uniform combustion and produces emission, such as soot. In contrast, the present invention moderates the in-cylinder flow that flows toward the radially inner side while still creating a certain amount of the in-cylinder flow that flows further to the radially outer side than the standing wall region with a help of a reverse squish flow created when the piston descends. This suppresses soot emission, for example, and realizes combustion effectively using the whole space of the combustion chamber.

In the combustion chamber structure described above, it is preferable that the first cavity includes, in a cross-section including a cylinder axis, a first section having an arc shape and located farthermost from the fuel injection valve, a second section provided between the first section and the connecting portion, and a third section extending from the first section toward a radially inner side, and the second section and the third section each has an arc shape, and a radius of the arc decreases from the second section to the first section and increases from the first section to the third section.

According to the combustion chamber structure, the arc shape continuing from the first to third sections enables the mixed gas to suitably flow without stagnating in the first cavity. That is, the in-cylinder flow that flows from the connecting portion toward the first section via the second section is accelerated along the radius of the arc decreasing toward the first section. Then, the in-cylinder flow is decelerated at the third section and guided to the radially inner side. When the reverse squish flow exists, the reverse squish flow induces the in-cylinder flow to flow toward the radially outer side again. The created flow can suppress stagnation of the mixed gas in the first cavity.

In the combustion chamber structure, preferably, the fuel injection valve includes an injection hole to inject fuel, and the injection hole has an injection axis along which fuel is injected toward the connecting portion at a predetermined crank angle.

In the combustion chamber structure, the fuel injected toward the connecting portion collides with the connecting portion and is then spatially separates into a flow that flows toward the first cavity (to the lower side) and a flow that flows toward the second cavity (to the upper side). Mixed gases are created respectively using the air existing in the first cavity and the air existing in the second cavity.

Preferably, the combustion chamber structure further includes a fuel injection controller that controls fuel injection performed by the fuel injection valve, where the fuel injection controller causes the fuel injection valve to perform at least a main injection performed at a timing when the piston is near a top dead center of compression and a pilot injection at a timing earlier than the timing of the main injection, and the injection hole has an injection axis along which fuel is injected toward the connecting portion at a crank angle at which the pilot injection is performed.

In the combustion chamber structure, the fuel injected by the pilot injection is spatially separated as described above. The fuel injected by the main injection creates another mixed gas using the air existing between the spatially separated mixed gases, which are the mixed gas that has entered the first cavity and the mixed gas that has entered the second cavity. In a manner chronologically separated from the pilot injection, a mixed gas is created using the air existing in the combustion chamber. Accordingly, a further uniform, lean mixed gas can be created in the combustion chamber.

In the combustion chamber structure, the fuel injection controller preferably performs the pilot injection in an operating range where the engine operates under a middle load.

An effect by the spatial separation of the fuel tends to be insufficient when an amount of the injected fuel is too large (high-load) or too small (low-load). In a former case, the created mixed gas tends to have a high fuel concentration and results in production of soot. This is because the volume of the first cavity in the lower side, regarding the cylinder axial direction, is not large enough for a fuel amount, that is, the volume of the first cavity, resulting from separating the cavity into two cavities, is small. In the latter case, ignition performance tends to be low. This is because the fuel concentration of the mixed gas in the spaces of the first and second cavities are too low. Accordingly, the pilot injection P1 is preferably performed in an operating range of the middle load where the chances of the above described tendency is low.

In the combustion chamber structure, preferably, the cavity includes a tapered region extending from an upper end of the connecting portion to the second bottom of the second cavity, and the tapered region has a face having an inclination along the injection axis.

In the combustion chamber structure, the cavity includes the tapered region having an inclination along the injection axis of the fuel injection valve, so that the injected fuel can flow smoothly along the tapered region toward the radially outer side of the combustion chamber without being disturbed. This contributes to creating a further uniform, lean mixed gas.

According to the present invention described above, an engine combustion chamber structure having a cavity in a crown face of a piston to create a uniform, lean mixed gas effectively using an air in the combustion chamber and thereby producing as less emission, such as soot, as possible can be provided.

The invention claimed is:

1. An engine combustion chamber structure comprising:
   a combustion chamber of an engine, the combustion chamber being formed by a lower face of a cylinder head, a cylinder, and a crown face of a piston; and
   a fuel injection valve that injects fuel into the combustion chamber, wherein
   the crown face of the piston is provided with a cavity,
   the fuel injection valve injects fuel toward the cavity and is disposed at or near a radial center of the combustion chamber,
   the cavity includes
      a protruding hill portion provided just below the fuel injection valve,
      a first cavity that is provided in a radially central region of the crown face and includes a first bottom having a first depth from the crown face in a cylinder axial direction and a first inner end provided in a radially innermost of the first cavity and adjoining a lower end of the hill portion, the first inner end and the first bottom connected by a continuously concave curved face gradually becoming lower toward a radially outer side,
      a second cavity that is provided in the crown face to be in an outer side of an outer circumference of the first cavity and includes a second bottom having a second depth in the cylinder axial direction, the second depth from the crown face being smaller than the first depth,
      a connecting portion that connects the first cavity to the second cavity, and
      a standing wall region disposed further in the radially outer side than the second bottom of the second cavity,
   the second bottom is provided lower than an upper end, regarding the cylinder axial direction, of the connecting portion, and
   a lower section of the standing wall region is provided further in a radially inner side than an upper edge of the standing wall region.

2. The engine combustion chamber structure according to claim 1, wherein
   the first cavity includes, in a cross-section including a cylinder axis,
   a first section having an arc shape and located farthermost from the fuel injection valve, a second section provided between the first section and the connecting portion, and a third section extending from the first section toward a radially inner side, and
   the second section and the third section each has an arc shape, and a radius of the arc decreases from the second section to the first section and increases from the first section to the third section.

3. The engine combustion chamber structure according to claim 1, wherein
   the fuel injection valve includes an injection hole to inject fuel, and the injection hole has an injection axis along which fuel is injected toward the connecting portion at a predetermined crank angle.

4. The engine combustion chamber structure according to claim 3, further comprising
a fuel injection controller that controls fuel injection performed by the fuel injection valve, wherein
the fuel injection controller causes the fuel injection valve to perform at least a main injection performed at a timing when the piston is near a top dead center of compression and a pilot injection at a timing earlier than the timing of the main injection, and
the injection hole has an injection axis along which fuel is injected toward the connecting portion at a crank angle at which the pilot injection is performed.

5. The engine combustion chamber structure according to claim 4, wherein
the fuel injection controller performs the pilot injection in an operating range where the engine operates under a middle load.

6. The engine combustion chamber structure according to claim 3, wherein
the cavity includes a tapered region extending from the upper end of the connecting portion to the second bottom of the second cavity, and
the tapered region has a face having an inclination along the injection axis.

7. The engine combustion chamber structure according to claim 3, further comprising
a fuel injection controller that controls fuel injection performed by the fuel injection valve, wherein
the fuel injection controller performs a pilot injection in an operating range where the engine operates under a middle load.

8. The engine combustion chamber structure according to claim 1, wherein
the crown face of the piston is provided with an annular flat portion disposed further in the radially outer side than the cavity,
the connecting portion has a convex shape formed of a curved face having a first radius in a cross-section along the cylinder axial direction,
the second cavity has, in the cross-section along the cylinder axial direction, a concave shape formed of a curved face having a second radius in a region between the second bottom and the standing wall region, and a convex shape formed of a curved face having a third radius in a region between the upper edge of the standing wall region and the annular flat portion, and
a sum of the first radius and the second radius is larger than a first distance, and a sum of the second radius and the third radius is set to be equal to or less than a second distance where the first distance is a distance along the cylinder axial direction between a center of the first radius and a center of the second radius and the second distance is a distance along a cylinder radial direction between the center of the second radius and a center of the third radius.

9. The engine combustion chamber structure according to claim 6, wherein
the tapered region has a face having the same inclination as the inclination of the injection axis from a horizontal line along the radial direction.

\* \* \* \* \*